United States Patent [19]

Mero et al.

[11] Patent Number: 5,560,943
[45] Date of Patent: Oct. 1, 1996

[54] APPARATUS FOR ANNEALING AND BLOWING A THERMOPLASTIC BIAXIALLY ORIENTED CONTAINER

[75] Inventors: Christopher Mero, New Millford, Conn.; John Cahill, Yorktown Heights, N.Y.

[73] Assignee: PepsiCo., Inc., Purchase, N.Y.

[21] Appl. No.: 500,372

[22] Filed: Jul. 6, 1995

Related U.S. Application Data

[62] Division of Ser. No. 200,917, Feb. 22, 1994, which is a continuation of Ser. No. 949,783, Sep. 22, 1992, abandoned.

[51] Int. Cl.$^6$ .................................................. B29C 49/64
[52] U.S. Cl. ................................................................ 425/526
[58] Field of Search .............................. 425/526, 522, 425/525; 428/36.92; 264/235, 346, 521, 528, 529, 530, 532

[56] References Cited

U.S. PATENT DOCUMENTS

| | | | |
|---|---|---|---|
| 3,984,498 | 10/1976 | McChesney et al. | 525/230 |
| 4,014,724 | 3/1977 | Rausing | 156/86 |
| 4,087,227 | 5/1978 | Uhlig | 425/526 |
| 4,144,298 | 3/1979 | Lee | 264/532 |
| 4,221,759 | 9/1980 | Hubert et al. | 264/520 |
| 4,233,022 | 11/1980 | Brady et al. | 425/525 |
| 4,260,567 | 4/1981 | Poppe et al. | 264/572 X |
| 4,318,882 | 3/1982 | Agrawal et al. | 264/521 |
| 4,385,089 | 5/1983 | Bonnebat et al. | 264/523 X |
| 4,397,808 | 8/1983 | Yoshino et al. | 264/521 |
| 4,406,854 | 9/1983 | Yoshino | 264/532 |
| 4,411,610 | 10/1983 | Poppe et al. | 425/174.4 |
| 4,431,398 | 2/1984 | Aoki | 425/446 |
| 4,463,121 | 7/1984 | Gartland et al. | 524/291 |
| 4,476,170 | 10/1984 | Jabarin | 428/36.92 |
| 4,485,134 | 11/1984 | Jacobsen | 215/16 X |
| 4,488,279 | 12/1984 | Wilkinson et al. | 369/54 |
| 4,505,664 | 3/1985 | Craig | 425/525 |
| 4,572,811 | 2/1986 | Ota et al. | 264/520 X |
| 4,588,620 | 5/1986 | Marcinek | 428/542.8 X |
| 4,649,068 | 3/1987 | Collette | 428/36.92 |
| 4,725,464 | 2/1988 | Collette | 428/542.8 X |
| 4,731,513 | 3/1988 | Collette | 219/770 |
| 4,755,404 | 7/1988 | Collette | 428/36.92 |
| 4,758,452 | 7/1988 | Jakobsen et al. | 428/36.92 |
| 4,871,507 | 10/1989 | Ajmera | 264/529 X |
| 4,889,247 | 12/1989 | Collette et al. | 215/42 |
| 4,927,680 | 5/1990 | Collette et al. | 428/36.92 |
| 4,928,835 | 5/1990 | Collette et al. | 215/42 |
| 5,066,528 | 11/1991 | Krishnakumar et al. | 428/542.8 X |
| 5,080,855 | 1/1992 | Belcher | 264/532 |
| 5,085,822 | 2/1992 | Uehara et al. | 264/528 |

FOREIGN PATENT DOCUMENTS

| | | | |
|---|---|---|---|
| 2339019 | 2/1975 | Germany | 425/526 |
| 54-103474 | 8/1979 | Japan | 264/346 |
| 56-105935 | 8/1981 | Japan . | |
| 60-189418 | 9/1985 | Japan . | |
| 2009029 | 6/1979 | United Kingdom . | |

*Primary Examiner*—Richard L. Chiesa
*Attorney, Agent, or Firm*—Scully, Scott, Murphy & Presser

[57] ABSTRACT

An apparatus for annealing biaxially oriented articles is disclosed, particularly blow molded articles prepared from unique tapered preforms which are immediately annealed using warm fluid in a segmented mold. Portions of the segment mold, used to form the articles, are temperature controlled at various temperatures by passing warm water through conduits in the neck-shoulder portion and body portion of the mold segment and cold water through the bottom and shoulder portion of the mold to bring the temperature of the article wall to about 65° C. to 85° C. for PET bottles. The body wall temperature is preferably lowered to about 80° C. while the neck-shoulder and bottom and shoulder portions are lowered to at least 70° C. The annealing increases the articles structural strength, removes temperature and biaxial stress, reduces gas permeability, retains transparency and allows for multiple reuse of the article including hot washing thereof.

6 Claims, 2 Drawing Sheets

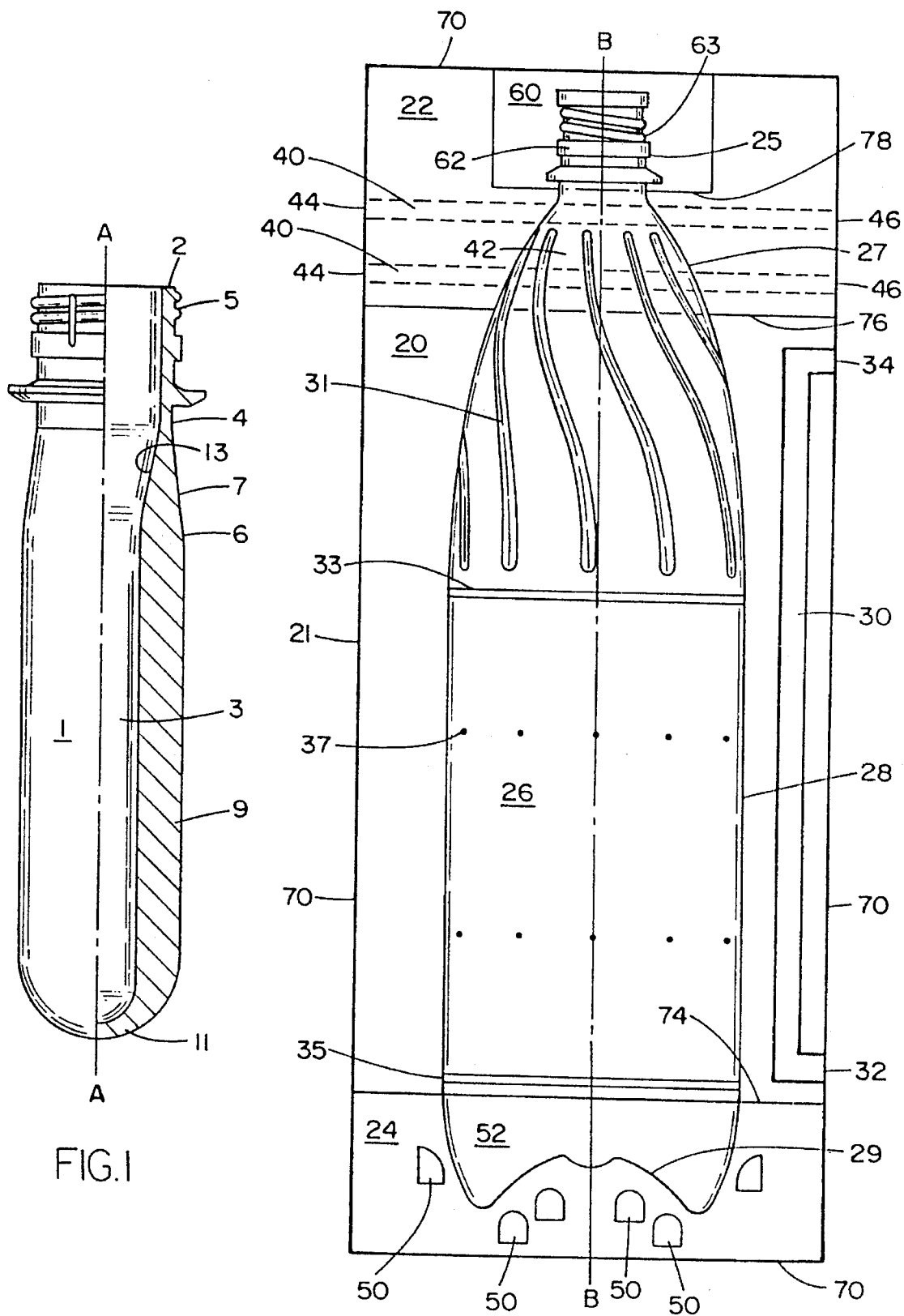

APPARATUS FOR ANNEALING AND BLOWING A THERMOPLASTIC BIAXIALLY ORIENTED CONTAINER

This is a divisional of copending application Ser. No. 200,917 filed on Feb. 22, 1994 which is a File Wrapper Continuation of Ser. No. 949,783 filed on Sep. 22, 1992 now abandoned.

BACKGROUND OF THE INVENTION

1. Field of the Invention

The present invention relates to a thermoplastic preform, apparatus and process for blow molding the preform into biaxially oriented, shaped articles and, more particularly, to annealing returnable polyethylene terephthalate bottles which are subjected to washing and reuse.

2. The Prior Art

Refillable plastic bottles reduce landfill and recycling problems of disposable plastic beverage bottles and, more particularly, those bottles formed from polyethylene terephthalate or PET.

A refillable plastic bottle must remain aesthetically pleasing and functional over numerous washings and refillings as discussed by U.S. Pat. Nos. 4,755,404, 4,725,464 and 5,066,528. Cracks, color changes, volume or structural change must be minimized.

U.S. Pat. No. 4,385,089, teaches how hollow biaxially oriented shaped articles are formed from intermediate products which may be sheets or other shapes when thermoformed or parisons or preforms when injection molded, injection blown or extrusion blown. The preform may be prepared and immediately used hot or may be stored and reheated later to a temperature having sufficient elasticity to be shaped into a bottle or other form by drawing and blowing in a cooled mold to obtain the final shape of the article. The preform is next often subjected to a heat treatment at well above the glass transition temperature of the thermoplastic to increase the articles strength and resistance to gas loss. Heat treatment also prevents distortion when the bottle is reused, including distortion during a hot caustic wash.

For other heat treating patents, see U.S. Pat. No. 4,233,022 and patents cited therein. The '022 patent teaches use of a blow mold comprising four sectional members each separated by insulating portions used to heat treat blown bottles at a temperature within the range of 150° C. to 220° C.

U.S. Pat. No. 5,085,822, teaches it is old to blow in a mold at 130°C. and cool to 100°C. to prevent deformation on removal of the container from the mold. Also taught is to retain a container in the blow mold and heat to remove stress and thereafter transferring the deformable container to a separate cooled mold to solidity. The "822" patent holds the molded container for a predetermined period of time to heat set the container followed by introducing a cooling fluid into the bottle. Also disclosed is heat setting a blown container in a separate mold.

U.S. Pat. No. 4,505,664, teaches transporting the blowing cavity and blown article to a second station where medium is circulated through the article.

U.S. Pat. No. 4,488,279, biaxially orients the article which can then be heat set.

U.S. Pat. No. 5,080,855, teaches blow molded articles which may be heat set in a second mold. Also, see also U.S. Pat. No. 4,485,134, 4,871,507 and 4,463,121 which discuss heat treating biaxially oriented bottles.

U.S. Pat. No. 4,572,811, teaches heat treating a PET container to form a spherulite, opaque texture which we have found leads to stress cracking when bottles are recycled.

U.S. Pat. No. 4,588,620, teaches preforms having a thinner bottom wall and which permit longer or deeper stretch of the shoulder and sidewall portions.

While it is known to biaxial stretch a preform using pressure, we have found the annealing of-the blown preform to be a critical factor in producing carbonated beverage bottles that are refillable.

SUMMARY OF THE INVENTION

The present invention presents a unique preform designed to form a refillable bottle, and a method and apparatus that applies three unique temperatures on the inner wall of a warm blow mold to precisely anneal a blown article such as a beverage container.

A hot preform, about ≈90° C. to 110° C., is rapidly expanded against the inner surface of the warm mold and held there by internal pressure until the temperature of the shaped container reaches the annealing temperature of the mold wall in the case of at least the neck-shoulder and body portions of the bottle. The bottom heel portion which is relatively thick and amorphous is cooled as rapidly as possible to reduce the base temperature to below the body wall annealing temperature.

Portions of the mold section have channels for passing warm water through the mold wall to control the wall temperature and anneal the blown article at the desired temperature.

Each portion substantially abuts and often contacts adjoining portions so that the temperature of the mold wall near the edge of each portion exhibits a gradual temperature profile and avoids sharp temperature differences which can stress the bottle and result in bottle failure during reuse. The body section of the mold is maintained at about 80° C. using 80° C. warm water. The neck-shoulder area is maintained at 70° C. or below normally about 60° C. using warm water. These temperatures rapidly reduce the blown thermoplastic temperature for PET from just above the glass transition temperature to 80° C. on the side wall and 60° C. on the upper wall section, thus, annealing the container and reducing stress. The bottom heel portion of the molded article is cooled with cold water to rapidly reduce the thicker base to below 80° C. normally below 70° C..

The preform is designed with an inside and outside uniformly tapered wall which increases the wall thickness from the neck to side or body portion of the preform at least two fold.

BRIEF DESCRIPTION OF THE DRAWINGS

FIG. 1 shows a preform having taper wall, prior to blow-molding and annealing.

FIG. 2 shows a blow-mold section in which, when closed with another opposing section, the preform is rapidly expanded and illustrates the three temperature controlled portions of the mold used for annealing.

DETAILED DESCRIPTION OF THE PREFERRED EMBODIMENTS

Figure 3:
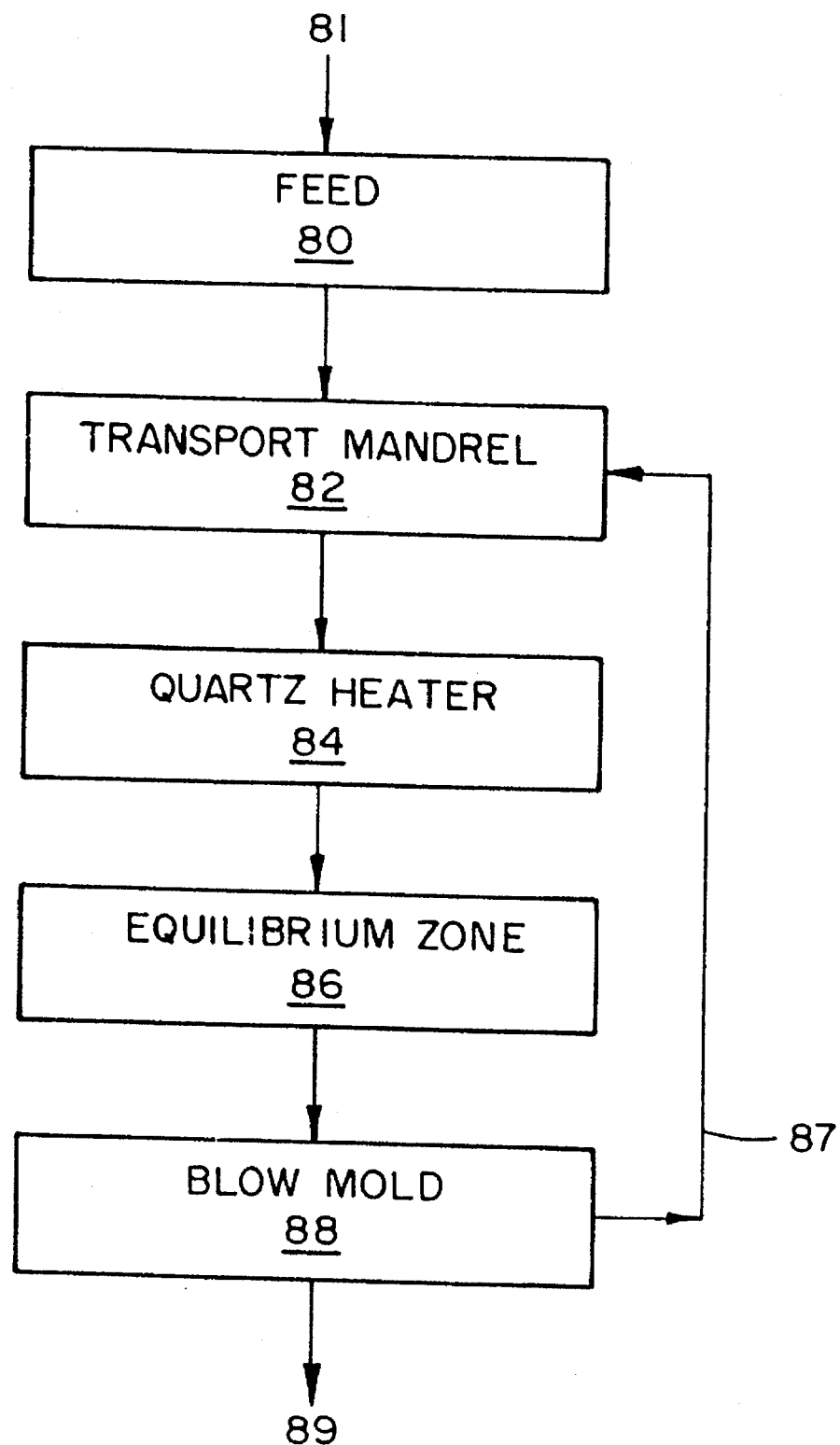
FIG. 3 is a block diagram illustrating the various steps of the process and features of the apparatus.

The present invention relates to a preform, and an apparatus and method for annealing a blown molded thermoplastic article immediately after the preform is blown to the shape of the blow-mold. Rather than using a hot mold for heat treatment, where stickage can result, or a cold mold to rapidly cool the blown article, where stress can be developed, the side or body portion of the mold walls, upper bottle or neck-shoulder portion of the mold walls and the bottom and shoulder portion of the mold walls are each regulated to reduce and control the wall temperature or anneal the bottle wall which reduces and equalizes stress created during the biaxial stretching of the preform to the bottle shape. The annealing temperature is cool enough to allow the bottle to be removed from the mold without deformation.

The bottle herein described is a 1.5 liter carbonated beverage bottle which can be further treated or allowed to cool, stored and be later filled with product. The bottle may be cleaned using hot caustic and reused. Various size bottles are possible by making commensurate changes in the size of the preform and blow mold.

The preform 1 is shown in FIG. 1 where one-quarter of the preform has been cut in a plane perpendicular to the paper shown as A–A and within the plane of the paper exposing the quadrant marked 3 having relatively thin screw cap area 5 which becomes the neck portion 63 of FIG. 2, a tapered portion shown as 7 and 13 which when drawn and blown into a bottle forms the slowly tapering bottle surface apparent in FIG. 2 at 27 of the neck-shoulder portion 22 of the mold. There is a relatively long wall 9 which are drawn and blown into the long bottle wall contacting 28 shown in body portion 20 of the mold in FIG. 2. The preform base 11 may initially contain less thermoplastic than the side wall 9 but after being blow molded into a bottle is relatively thicker than the side walls and more difficult to cool and would contact surface 29 in the bottom and shoulder portion 24 of the mold shown in FIG. 2. The degree of taper of the inside 13 surface and outside 7 surface of the preform of FIG. 1 is extensive and sufficient to increase wall thickness at least 2 fold from neck to body.

For the 1.5 liter bottle the top of the neck or cap 2 of the preform of FIG. 1 has a thickness of 2.1 mm and the neck has a length of 28 mm prior to the beginning of the tapered portion. The thickness at the beginning of the taper at 4 is 2.75 mm and 6.9 mm shown at 6 on the body wall thickness. The tapered portion is 20 mm long and the constant circumference length of the body portion is 94 mm. The wall thickness at the narrowest portion of the bottom of the preform is 4 mm.

Referring now to FIG. 2, there is shown a mold section 21 having four mold portions 20, 22, 24 and 60 which are in cooperative and normally adjacent relationship to at least one of the other mold portions and comprise one-half of a female mold which, when closed, forms the general shape shown by the line marked 25, 27, 28 and 29 which outlines a cavity surface generally shown as 62, 42, 26, and 52. The cavity is normally formed by preparing a mold section in the shape of the bottle as if the bottle were cut along its axis B-B into two equal volumes. Of course more sections could be employed, if desired, as long as when closed they form a cavity having the shape of the desired bottle.

Certain surface ornamentation can be added as shown in 31, 33 and 35. Small openings 37 to remove gases may or may not be noticeable in the final blown and annealed container.

Warm water cooling channels, one of which is shown at 30, are equally spaced about the body portion 26 of the cavity in FIG. 2. These channels are connected to a warm water supply containing 80° C. water which is circulated throughout the metal body mold section shown as 20. Each channel may be connected to each other in either series or parallel relationship and maintain the surface of the mold cavity 26 at about 81° C. during operation, the wall being slightly hotter than the water supply resulting from contact with the hotter blown preform. Hot water is conducted through 32 and up through the channel 30 and out through 34 to another channel not shown in series operation or to a manifold, not shown for parallel operation. The size of the channels is governed by the amount of heat to be removed and the heat transfer characteristics of the mold and can be determined by one of ordinary skill in the art.

The neck-shoulder portion of the mold section shown at 22 including the upper wall surface 42 is maintained at about the temperature of the warm cooling water. Warm water below 70° C. and normally about 60° C. is conducted throughout the cooling channels generally shown as 40 by dotted lines. Inlet 44 and outlet 46 can be connected in parallel or series as desired. The neck-shoulder portion 22 is normally cooled to about 60° C. which allow the bottles removal from the mold without deformation.

The bottom heel portion 24 of the mold section 21 is also cooled by cold water passed through channels shown as 50 in a manner similar to the other portions of the mold. Cold water is used to lower the bottle wall in contact with surface 52 as quickly as possible to reduce the thermoplastic wall temperature to below 80° C., preferably below 70° C..

A fourth mold section 60 is shown about the neck portion of the preform which is not normally heated or cooled and remains cool and amorphous. If desired, heating or cooling channels or equivalent heating or cooling means may be provided.

Obviously, mold portions 60, 20, 22, and 24 of mold section 21 can be contained within an outer hydraulic mold system surrounding at least a portion of the mold section 21 outer wall shown as 70. If desired, channels for controlling mold wall temperature may be contained in the outer mold system in addition to or alternatively to the channels in the mold portions 60, 20, 22 and 24.

The mold portions are normally affixed to each other or an-outer mold system by means well known to the art and not shown. The mold portions generally substantially abut and often touch each other at 74, 76 and 78, without use of insulation, which allows the metal in adjacent mold sections to reach a temperature which gradually changes in the area of 74, 76 and 78 preventing stresses caused by the difference in bulk temperature of sections 20, 22, 24 and 60, While water is described as the usual heat transfer fluid, any appropriate oil or other fluid might be used. Other appropriate heating or cooling means known in the art can be used in place of and in conjunction with the heat transfer fluid. Resistance heating may be employed, for example, in the body area. The cooling channels may be of any desired shape and configuration but are generally circular and are straight through the mold portion. If the channel is made to abut another portion of the mold, other shapes can be easily formed like those shown as 50 in FIG. 2.

In operation the annealing process may be employed as part of a rotary or linear blow molding process. We prefer a linear configuration of stationary molds because of the ease of feeding heat transfer fluid through stationary piping and the limited number of bottles under manufacture should there be mechanical failure or problems. However, rotary annealing configurations can be employed if desired and provide higher output of bottles for a given factory area.

Referring now to FIG. 3, room temperature preforms 81 are conveyed to a preform feed unit 80. The preforms are gripped by the neck 5 of FIG. 1 and placed on transport mandrels at 82. The preforms are passed through infrared quartz heaters at 84 to bring the sidewalls and bottom 7, 9 and 11 of FIG. 1 to proper temperature for blowing usually between about 90 to 110° C. The preforms are allowed to equilibrate at 86 so that the heat is allowed to flow throughout the preform reducing the high surface temperature and adjusting the preform temperature throughout its wall thickness. From there the preforms are transferred to a blow station 88 where they are blown using high pressure air or other gas against two closed mold one shown as 21 in FIG. 2. The axial direction is also generally stretched by mechanical means such as push rods which drive the closed end of the preform to the bottom of the blow mold. The blown article is annealed in the blow mold 88 to below 95° C., preferably about 65° C. to 85° C., preferably about 80 20 C. in the body portion 20 of FIG. 2, below 70° C. and usually controlled at 60° C. at the neck-shoulder portion 22 of FIG. 2, and below 70° C. in base and shoulder portion 24 of FIG. 2. Usually up to 25 seconds, preferably up to 10 seconds is required to maintain the expanded thermoplastic against the segmented mold portions to properly reach the desired wall temperature of 80° C. for the main wall surface 26 in portion 20 of FIG. 2, below 70° C. in the upper wall surface 42, preferably 60° C. in portion 22 of FIG. 2 and below 70° C. in the base and heel surface 52 of portion 24 of FIG. 2. The bottles 89 in FIG. 3 exit the blow station and go on to further treatment, for example, air cooling and storage preparatory to filling. The mandrels 87 are returned to the loading station.

In a rotary system the preforms are fed to the loading station. At the loading station the preforms are loaded onto the transport mandrel. A rotating heater is equipped with a number of stations holding the transport mandrels as they pass in front of the heating units. The preforms can be rotated on their own axis to insure uniform heating. Infra-red quartz lamps are controlled separately to obtain the desired temperature profile for each preform. While the bulk of the body side wall should be at a temperature of about 90° C. to 110° C. for PET, adjustments in temperature can be made to insure best preform blowing conditions.

The preform temperature is next equalized by passing the preforms to an equalizing wheel which may have neck cooling to insure the neck area is cool for blowing. The object of the equalization wheel is to allow time for the temperature to become even or equilibrated across the wall thickness. From the equalizing wheel the heated preforms are transferred and are locked into position in each of a number of water cooled mold stations. Mold halves are pneumatically actuated and locked into place. The preform is stretched using a stretch rod while high pressure air at 400 to 600 psi is used to rapidly expand the preform against the inner mold surfaces. The blown bottle is maintained against the segmented mold portions shown in FIG. 2 up to 25 seconds, preferably up to 10 seconds and normally about 2 to 6 seconds to bring the bottle wall temperature to the desired annealing temperature.

In the linear version of the process the molds are stationary and the preforms indexed into the mold which is mechanically or hydraulically closed.

The process can be applied to a variety of thermoplastic materials such as amorphous or only slightly crystalline material which do not crystallize substantially during monoaxial or biaxial blowing such as polyamides or saturated polyesters like polyesters of lower alkylene glycols and terephthalic acid such as ethylene glycol terephthalate or polymers that are amorphous prior to blowing and crystallize during biaxial stretching such as saturated polyesters like polyesters of aromatic acids such as terephthalic acid, naphthalene dicarboxylic acids or hydroxybenzoic acids with diols such as lower alkylene glycols, for example, ethylene glycol, propylene glycol or the like and mixtures and copolymers thereof.

The process is particularly useful for polymers which are generally blown from amorphous to crystalline state such as mono and copolymers of ethylene-glycol-terephthalic acid-esters generically known as polyethylene terephthalate or PET.

Biaxial orientation of the articles, particularly bottles useful for still or carbonated beverages, is accomplished by stretching the thermoplastic material, such as PET, in the axial and hoop directions simultaneously as the article is being formed. Often stretching in the axial direction is assisted by a mechanical rod used to force the closed end of a preform to the base of a mold as high internal pressure is applied to the preform causing stretching in both the hoop and axial directions. The preform is forced against the outer mold surfaces to shape the article and anneal the article at about 95° C. or below which further strengthens it and prevent stress cracking and other problems.

Biaxial orientation provides excellent properties such as strength and resistance to gas loss to the article. However, the stretching with immediate cooling (or stretching in a high temperature mold for heat setting by developing further crystallization) leaves the article under high stress which causes excessive shrinkage on reuse. Areas that have a thicker shell, such as the bottom heel and neck have less or no orientation and crystallinity and the contrast between amorphous and crystalline areas causes stress cracking on reuse of such bottles. This problem is overcome by using annealing. Preforms are also often heat profiled at different temperature to improve the wall thickness distribution of the final article and this causes further stress in the walls of the blown article.

This invention is directed to a process and apparatus for reducing wall stress in articles such as bottles by subjecting the blown thermoplastic article to direct and immediate annealing by regulating and controlling the wall temperature of the blow mold so that the body or main wall portion of the article, which has undergone the most biaxial stretching and crystallization is lowered to about 95° C. or below, preferably to 65° C. to 85° C. and more preferably about 80° C. by maintaining the mold wall in contact with that portion of the article at that temperature. The upper portion of the wall near the neck, referred to herein as the Deck-shoulder portion is lowered to 85° C. or below, preferably 70° C. or below usually about 60° C. while the lower or bottom portion of the bottle referred to herein as the bottom heel portion is reduced to below 85° C. and preferably below 70° C. using cold water since the bottle is thickest at this point and most difficult to cool.

The thermoplastic material is normally blown at a temperature which will vary depending on the polymer but which is generally between 90° C. and 110° C. for PET. This means that usually substantial heat must be removed from the article by cooling the mold to the desired annealing temperature. The bottle wall annealing temperature is that temperature where the bottle can be removed from the mold without deformation. One might refer to our process as warm blowing since the mold surfaces are warm in the body and neck-shoulder region. Normal processes employ a cold mold cooled as rapidly as possible.

We have found that annealing the blown bottle at about 65° C. to 85° C., depending on the area of the bottle, allows one to reuse the bottles, including cleaning them at 60° C., without losing the strength developed during biaxial stretching and the annealing treatment. The annealing process, in addition to reducing thermal stress and biaxial stress differences, also strengthens the bottle, makes it more resistant to stress cracking and improves gas barrier properties.

The period of contact between the warm mold and the hollow shaped hot article is dependent on the thickness of the walls and the time necessary to reduce the wall temperature to the desired 65° C. to 85° C. a range. Up to 25 seconds residence time is sufficient with 1 to 10 seconds preferred. Usually from 3 to 6 seconds is sufficient to lower the base-shoulder region of the wall (the thickest part) to 70° C. or below.

Various portions of the segmented mold may be cooled, usually by warm water with the base heel portion cooled with cold water. While other cooling fluid could be used, as well as any known techniques for rapidly and effectively removing heat, we have found water to work well.

The process of this invention can be employed on any thermoplastic article where annealing is required and where reuse is likely. The process anneals the thermoplastic article at a temperature above that likely to be employed for washing the article; generally at least 5° C. or 10° C. above the highest contemplated washing temperature. In general, for PET, the temperature of the article body is reduced to 85° C., preferably about 80° C. while the neck-shoulder portion is lowered to about 70° C. and the base and shoulder portion lowered to 70° C. or below.

The process of this invention can also be employed on multilayer articles containing thermoplastic materials especially PET.

The process of this invention maintains high transparency, relieves stress, prevents stress cracking, and improves dimensional stability in the temperature range used for filling or cleaning the shaped articles.

What is claimed:

1. An apparatus for annealing and blowing a thermoplastic, biaxially oriented, container comprising:

a blow mold having sectional members which cooperatively define an interior cavity having a longitudinal axis substantially conforming to the shape of a hollow container having a neck portion, a neck-shoulder portion, a body portion and a bottom and heel portion;

said sectional members having at least three thermally controlled substantially abuting portions in cooperative relationship to each other along the longitudinal axis such that said neck-shoulder portion is maintained at a temperature of no more than 85° C., said body portion is maintained at a temperature of no more than 95° C. and said bottom-heel portion is maintained at a temperature of below 85° C.;

means for loading a thermoplastic preform into said interior cavity and closing the mold sections;

means for expanding the preform to form container;

means for annealing at least the neck-shoulder and body portions of the container at a temperature of below 95° C.; and means for recovering the annealed container.

2. The apparatus of claims 1 wherein the body portion of the segmented mold is maintained at a temperature of about 65° C. to 85° C.

3. The apparatus of claim 2 wherein said body portion of said segmented mold is maintained at a temperature of about 80° C..

4. The apparatus of claim 1 wherein the neck-shoulder portion of the segmented mold is maintained at a temperature of 60° C. to below 70° C..

5. The apparatus of claim 1 wherein the bottom and heel portion of the segmented mold is maintained at a temperature of below 70° C..

6. The apparatus of claim 1 in which the thermally controlled portions of the mold contact each other providing a contoured temperature change between bottle portions in contact with thermally controlled sectional mold portions.

* * * * *

UNITED STATES PATENT AND TRADEMARK OFFICE
CERTIFICATE OF CORRECTION

PATENT NO. : 5,560,943
DATED : October 1, 1996
INVENTOR(S) : Christopher Mero, et al.

It is certified that error appears in the above-indentified patent and that said Letters Patent is hereby corrected as shown below:

Column 5, line 20: "80 20 C." should read --80°C--.

Column 6, line 54: "Deck-shoulder" should read --neck-shoulder--.

Column 8, line 16, Claim 1: "bottom-heel" should read --bottom and heel--.

Column 8, line 26, Claim 2: "Claims 1" should read --Claim 1--.

Signed and Sealed this

Eighteenth Day of March, 1997

BRUCE LEHMAN

Attest:

Attesting Officer

Commissioner of Patents and Trademarks